UNITED STATES PATENT OFFICE.

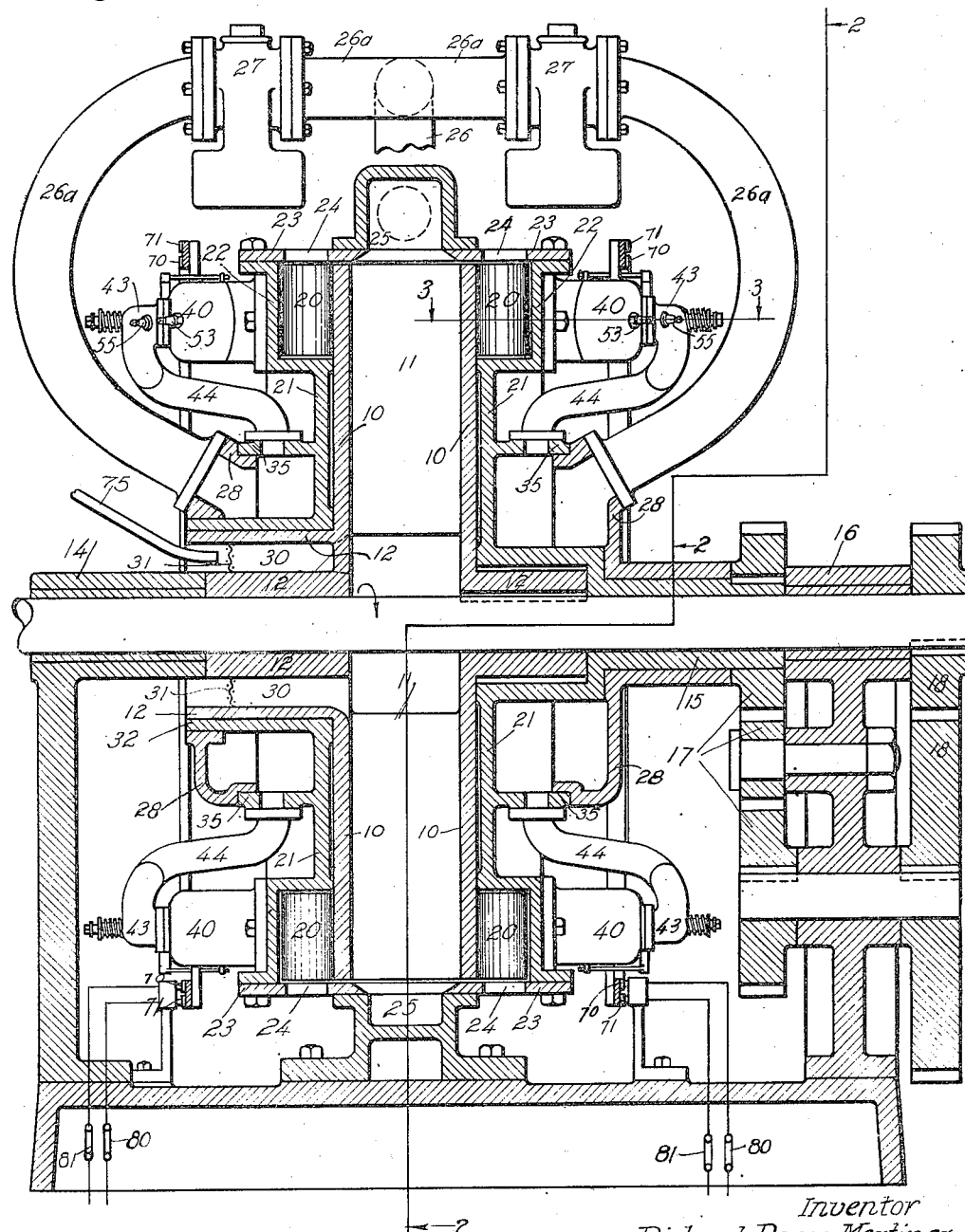

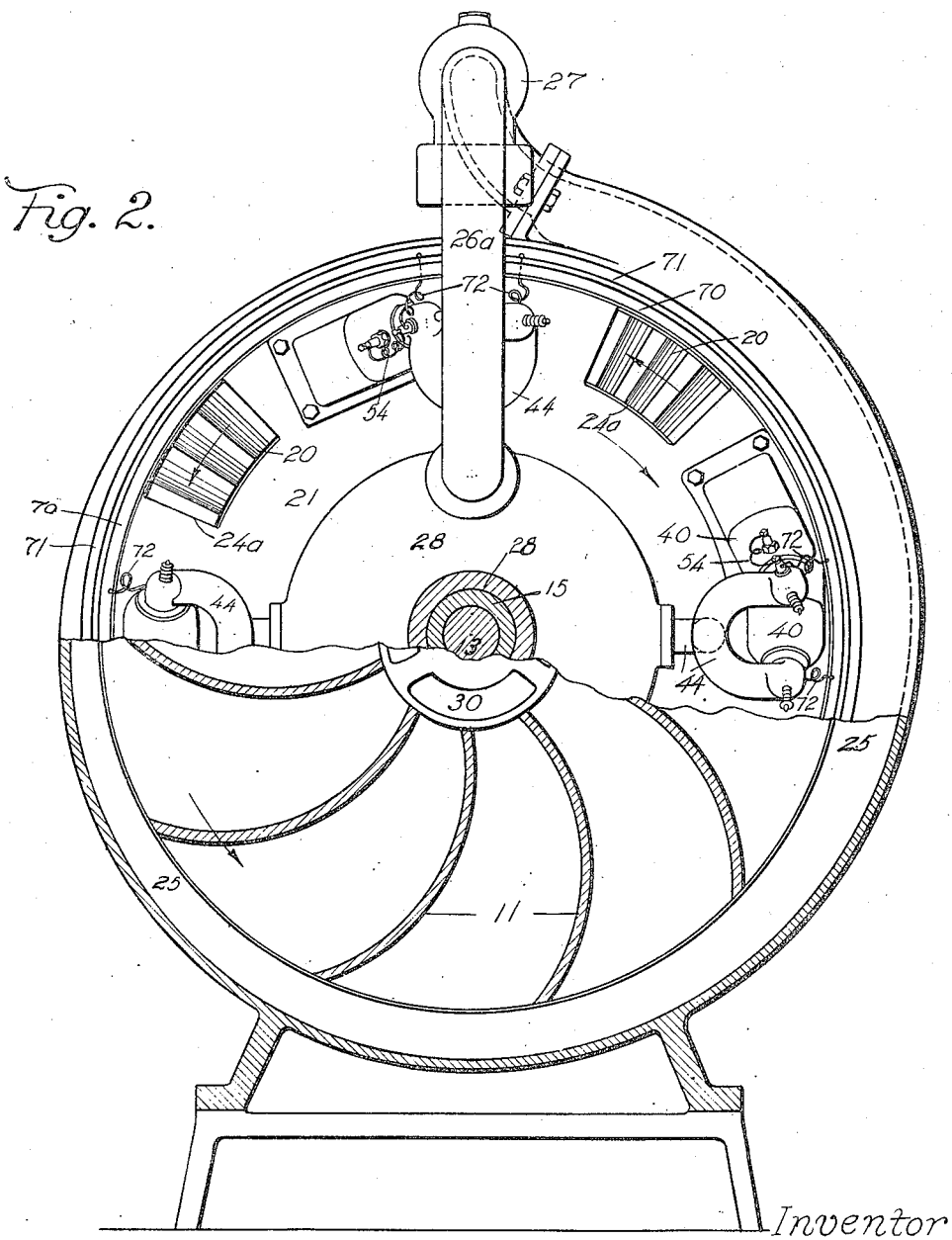

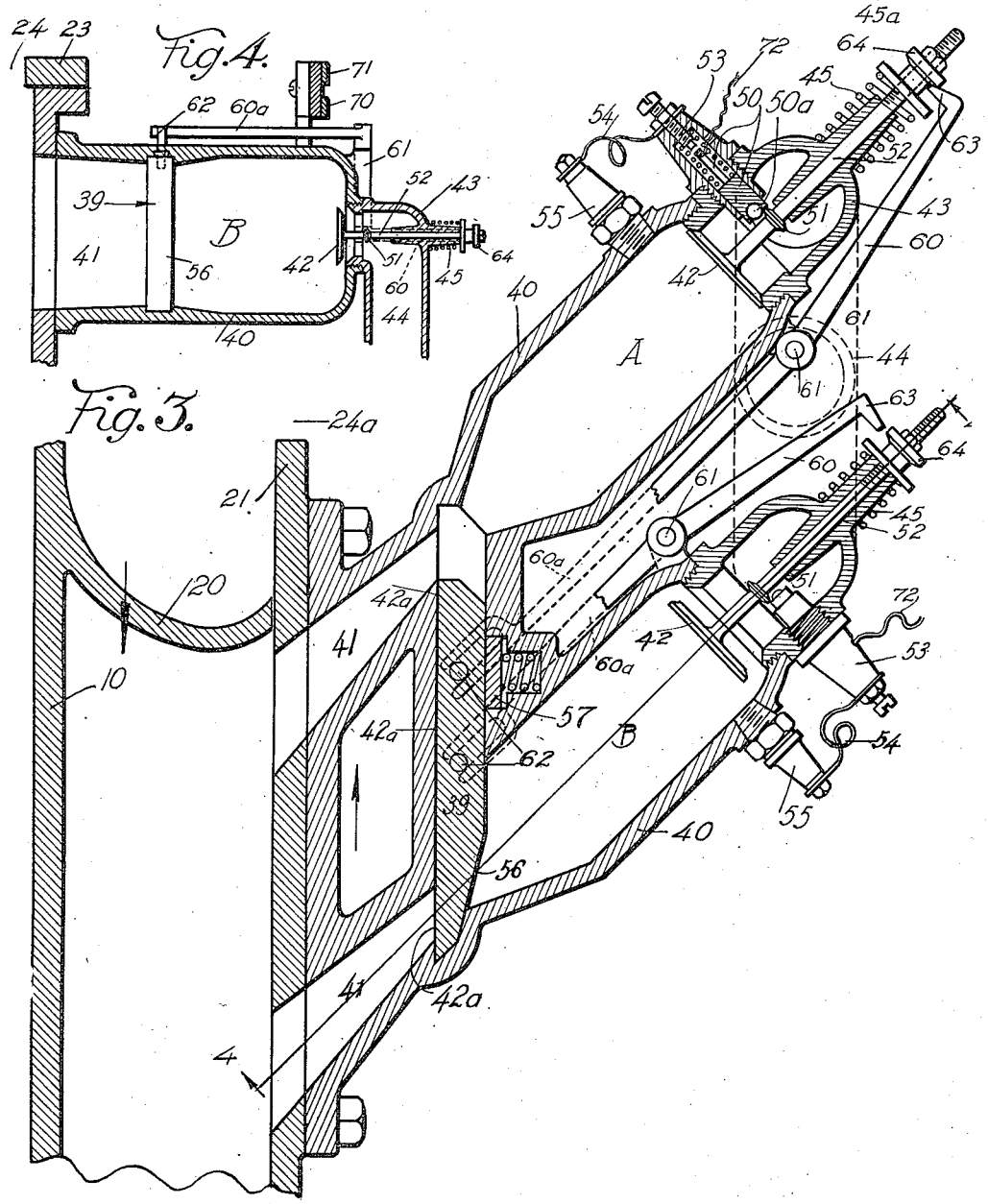

RICHARD PAZOS-MARTINEZ, OF VENICE, CALIFORNIA.

INTERNAL-COMBUSTION TURBINE.

1,387,166.  Specification of Letters Patent.  Patented Aug. 9, 1921.

Application filed August 5, 1918. Serial No. 248,433.

*To all whom it may concern:*

Be it known that I, RICHARD PAZOS-MARTINEZ, a citizen of the United States, and residing at Venice, in the county of Los Angeles, State of California, have invented new and useful Improvements in Internal-Combustion Turbines, of which the following is a specification.

This invention relates to internal combustion turbines; and it is an object of this invention to provide a type of turbine wherein the compression of the charge, of the air and the combustible vaporous mixture is carried on in a unitary structure which also contains the power elements of the turbine. It is an object of this invention to provide a compact, unitary apparatus in which all of the operations necessary to internal combustion power are carried on.

It is further an object, in one form of my invention to use a centrifugal means for compressing the air for a combustible mixture into the combustion chambers; this form of air compressor lends itself very well to compact formation and arrangement of the turbine, and acts with uniform efficiency at low and high altitudes.

Furthermore, it is an object to provide a combustion chamber organization, novel in itself, whereby rapid and efficient combustion and expansion may be had. I arrange the combustion chambers in pairs; and each chamber of a pair controls the actions of the other chamber in such a manner that the actions in the two chambers are inter-dependent. Firing occurs alternately in the two chambers; and the rapidity with which successive firings take place depends upon the speed at which the chamber can be filled and fired and does not depend on any timing apparatus. I preferably do not use any timing or distributing apparatus.

There may be as many pairs of combustion chambers as desired; and they may be arranged in two planes—one on each side of the machine and on each side of the central revolving element which carries the air compressor, so that the machine in such form is double, and the end thrust pressures on the various parts are equalized. All such features of the invention, and other features and other more specific objects of the invention will be most apparent from the following detailed description of a preferred form of apparatus, reference for this purpose being had to the accompanying drawings in which—

Figure 1 is a longitudinal vertical section of the improved turbine; Fig. 2 is a section on line 2—2 of Fig. 1; Fig. 3 is an enlarged section on line 3—3 of Fig. 1; Fig. 4 is a small detailed section on line 4—4 of Fig. 3.

In my preferred form of combustion turbine I utilize two rotating elements which I gear together to rotate in opposite directions. These elements may be described, for convenience in description and illustration of my invention, the inner and outer elements, respectively, although such relative position of the elements may not be always necessary. The rotation of one element is always in one direction and the other element in the opposite; and the inner element carries the air compressing devices which may preferably be in the form of a blower or fan for moving the air centrifugally; and the outer element carries the combustion chambers from which the ignited, expanding gases are directed by nozzles onto vanes carried by the inner element. The inner element may comprise two radial disks or plates 10 with blower vanes 11 between them, and this inner element may be carried on a hub 12 which is keyed to shaft 13. Shaft 13 is supported at one end in a bearing 14 and at the other end in bearing shaft 16. The gear trains shown at 17 and 18 connect bearing sleeve 15 (a part of the outer element) and shaft 16 so as to cause them to rotate simultaneously in opposite directions. If so desired the gearing may be made so that shaft 13 and the inner air blowing element will revolve at higher speed in one direction than the outer element revolves in the other direction. The air blower thus gets the benefit of a higher speed than it otherwise would; and this enables the blower to compress the air to a greater pressure. The blower compresses to a uniform pressure at any given speed; and this pressure is not materially affected by difference in altitude. On the outer side of each plate 10 of the inner element, near the periphery of those plates, I locate the reaction or impulse vanes 20. The outer element has annular plates 21 and near their peripheries these plates have walls 22 which surround the vanes 20 at their inner edges and at their sides. The two plates 21 may be structurally connected together by a rim or peripheral element 23 which may have openings 24 therethrough for the passage of exhaust radially from the vanes 20. Surrounding this rim element 24 there is a stationary annular chambered element 25 into which the air is thrown outwardly by the rotation of the inner element, which rotates in the direction indicated by the arrows in the various views. An outlet pipe 26 leads from element 25; and this pipe is divided into branches 26$^a$, each provided with a carbureter at 27 for carbureting the air which passes therethrough. Pipes 26$^a$ lead inwardly in opposite sides of the machine and lead into a stationary shell 28 by any suitable means, or by the pipes 26$^a$ themselves. From the interior of this shell the compressed air is distributed to the various combustion chambers as will be hereinafter described. At one side the outer rotating element has an open spider construction around shaft 13, as illustrated at 30, leaving passages through which air may have access to the space between vanes 11. This opening may be screened as indicated at 31 to keep out dust. The plate or disk 21 of the outer rotating element on this side of the machine may also have a bearing sleeve at 32 around the passaged hub 12. On the opposite side of the machine the sleeve 15 forms the bearing for the outer element, rotating on the shaft 13.

Each of the disks or plates 21 of the outer rotating elements carries a cylindrical distributing box 35 into which the cylindrical valve shell 28 projects. In a turbine constructed in accordance with my invention there may be as many individual combustion chambers as desired; but for simplicity of illustration I have shown only four sets on each side of the mechanism herein described. Each set comprises two combustion chambers which are operated in coöperation as will now be described.

In my improved arrangement I provide sets of combustion chambers of two each and arrangement is made whereby these combustion chambers automatically control each other; that is, they act in coöperation so that one fires after the other and the arrangement is such that the combustion chambers fire as fast as they can be filled with combustible mixture. The action will be readily understood from the following description. A pair of combustion chambers 40 is shown in Fig. 3. Nozzles 41 lead from these combustion chambers to direct the expanding gases against vanes 20, the gases by their velocity or by reaction, or both, driving the parts in the relative directions indicated, and the exhaust gases then escaping sidewise through the side exhaust openings 24$^a$ in plates 21 between the sets of combustion chambers. Now there is a common sliding valve 39 adapted to move back and forth and to shut off one or the other of nozzles 41 when in either of its extreme positions. When in the position shown in Fig. 4 then the chamber A is being filled with combustible mixture which is admitted by the valve 42 from manifold 43 which is supplied with mixtures through pipe 44 from the distribution box 35. A spring 45 normally holds the valve 42 closed; but the pressure in pipe 44 is sufficient to raise the valve to admit mixture to the chamber. The mixture will be admitted to the chamber until pressure in the chamber begins to be nearly equal to the pressure under the valve, when the valve, through action of spring 45, will move downwardly toward its seat. As the valve nears its seat, it will then suddenly seat itself due to the action hereinafter described, and during the last quick seating motion of the valve a contact mechanism is operated. This contact mechanism may be of any character and may embody, for instance, a spring pressed contact plunger 50 which is operated by a collar 51 on valve stem 52 and caused to engage an adjustable contact screw 53 just as the valve moves into its seat. The plunger 50 may have a ball 50$^a$ which engages the collar 51; and as the valve nears its seat and the collar comes into contact with the plunger ball the valve is temporarily restrained from seating until the pressure in the chamber has so nearly equalized with that under the valve that the spring 45 can then move the valve against the retarding action of the spring pressed plunger. When this occurs the collar 51 is snapped past the ball 50$^a$, moving the ball and plunger 50 outwardly and causing the plunger to momentarily contact with contact screw 53. Contact screw 53 is connected by wire 54 with spark plug 55 of the chamber; and ignition of the charge in the chamber consequently takes place just as the valve comes onto its seat. The pressure generated by the ignition immediately presses against the diagonal end surface 56 of the valve 39 and presses the valve over to its other position, opening the nozzle of the chamber in which explosion is taking place and closing the nozzle of the other chamber. Valve 39 is yieldingly held in position by any suitable means, as by a spring pressed friction block 57 which creates sufficient friction to prevent valve movement by the compression pressure, but insufficient to prevent movement of the valve by the explosion pressure. The valve having moved over to its other position, the expanding gases move out through the nozzle and act against the vanes 20. As soon as the valve has moved to position to close the nozzle of chamber B, then valve 42 of that chamber may rise to allow that chamber to be filled with explosive mixture. An automatic connection is provided between slide valve 39 and inlet valves 42 which provides that the inlet valves cannot open when the slide valve is open, but can open when the slide valve is closed. A swinging catch arm 60 is pivoted on a vertical axis at 61 and is adapted to be oscillated by co-action of arm 60ª with a pin 62 in valve 39. Catch arm 50 has slotted ends at 63 adapted to move to position over collars 64 in valve stems 52 to prevent their rising. When valve 39 is in position to open the nozzle of a chamber 40 then the valve 42 of that chamber is held against upward movement; and the valve 42 of the other chamber, whose nozzle is open, is allowed to rise. Thus, when valve 39 moves over to close the nozzle of chamber B, then mixture immediately begins to flow into chamber B, until the pressure in that chamber nearly equals the pressure in pipe 44, when inlet valve 42 closes, causing ignition, and causing the shifting of slide valve 39 back to its other position closing the nozzle of chamber A. During the time that chamber B has been filling, chamber A has been emptying and cooling; and during the time that chamber B is now emptying and cooling, chamber A will be filling and then firing. It will be seen that these two chambers automatically control each other and that they fill and fire just as fast as the mixture under pressure can fill them and as fast as the mechanism can operate. The arrangement has the advantage of great simplicity, needing no timing or controlling apparatus, has also the advantage of developing large power. If it is desired to cut off the action of any set of chambers, it is only necessary to break the ignition circuit thereto. For instance, half of the sets may be connected in one general ignition circuit, including one collector ring 70, while the other half may be supplied with ignition current through another circuit with another collector ring 71. Cutting current off from one circuit will throw out half the combustion chambers. This is seen to be true when it is considered that the movement of slide valve 39 is effected by ignition in one or the other of the chambers. If ignition is cut off, then one of the chambers will simply be filled up with mixture, and inlet valve 42 will close without causing ignition, and the whole mechanism will remain in that position; the other inlet valve 42 being prevented from opening and from thus wasting the mixture by the automatic connection between slide valve 39 and the inlet valves 42.

I may also provide means for introducing water vapor by having a water pipe 75 deliver water into the air inlet in any desired quantity. Water vapor keeps the chambers cool and adds to the expansive power of the gases. It will be noted that the valves, contact plungers, etc., are all in such positions and move in such directions that centrifugal force does not interfere with their proper movements; and therefore the turbine will operate properly at all speeds. The compression pressure in the combustion chambers—the pressure at which the valve closes and the mixture is ignited—may be regulated by regulating the tension on springs 45 by nut 45ª. Thus the compression pressure may be controlled and regulated to suit different fuels as well as to suit the pressure to which the air compressor compresses the air and the mixture. The ignition may be controlled by switches 80 and 81 by which one half the chambers on one or both sides of the machine, or the whole of one side of the turbine, may be cut out of operation.

Having described a preferred form of my invention, I claim:

1. In an internal combustion turbine, the combination of two rotating elements, connection means between the two said elements to cause them to rotate in opposite directions, one of said elements having vanes thereon, and the other having combustion chambers with nozzles directing gases of combustion against the said vanes; and means to compress the combustible mixture into said combustion chambers embodying centrifugal means in the rotating element which carries the vanes.

2. In an internal combustion turbine, the combination of two rotating elements, connection means between the two said elements to cause them to rotate in opposite directions, one of said elements having vanes thereon, and the other having combustion chambers with nozzles directing gases of combustion against the said vanes; means incorporated with the rotating element which carries said vanes to compress air by centrifugal action, means to carburet said air, and means to deliver such carbureted air under pressure into the combustion chambers.

3. In an internal combustion turbine, the combination of two rotating elements, connection means between the two said elements to cause them to rotate in opposite directions, one of said elements having vanes thereon, and the other having combustion chambers with nozzles directing gases of combustion against the said vanes; means incorporated with the rotating element which carries said vanes to compress air by centrifugal action, means to carburet said air; said chambers being arranged in pairs, and the chambers of each pair controlling the action each of the other so that the chambers act alternately.

4. In an internal combustion turbine, the combination of two rotating elements, connection means between the two said elements to cause them to rotate in opposite directions, one of said elements having vanes thereon, and the other having combustion chambers with nozzles directing gases of combustion against said vanes; means incorporated with the rotating elements which carries said vanes to compress air by centrifugal action, means to carburet said air; said chambers being arranged in pairs, an outlet valve for each pair of chambers arranged to close the nozzle of one chamber or the other and adapted to be moved from one position to the other by the explosion pressure in either of the chambers, and means controlled by the position of said valve to admit explosive mixture to the chambers and ignite it.

5. In an internal combustion turbine, the combination of two rotating elements, connection means between the two said elements to cause them to rotate in opposite directions, one of said elements having vanes thereon, and the other having combustion chambers with nozzles directing gases of combustion against the said vanes; means incorporated with the rotating element which carries said vanes to compress air by centrifugal action, means to carburet said air, and means to periodically deliver such carbureted air under pressure into the combustion chambers, said means embodying means for cutting off the operation of a part of said combustion chambers.

6. In an internal combustion turbine, the combination of two rotating elements, connection means between the two said elements to cause them to rotate in opposite directions, one of said elements having vanes thereon, and the other having combustion chambers with nozzles directing gases of combustion against said vanes; means incorporated with the rotating element which carries said vanes to compress air by centrifugal action, means to carburet said air, and means to periodically deliver such carbureted air under pressure into the combustion chambers; said chambers being arranged in pairs; a valve having two positions in one of which it closes the nozzle of one chamber and in the other of which it closes the nozzle of the other chamber, a mixture admission valve for each chamber, means controlled by the admission valve to fire the mixture in the chamber, and control means whereby the position of the first mentioned valve controls the opening of the admission valves.

7. In a device of the character described, a combustion chamber, means to feed combustible mixture under pressure into said combustion chamber, a nozzle into which the combustion chamber discharges, a gate controlling communication of the combustion chamber with the nozzle, yielding means for normally holding the gate closed, and ignition means for the combustion chamber controlled in actuation by the feed means through movement of said gate.

8. In a device of the character described, a pair of combustion chambers, means to feed combustible mixture under pressure into said combustion chambers, outlets for the combustion chambers, an impulse member against which the outlets deliver expanding products of combustion from the chambers, coöperating closures for said outlets adapted to close first one outlet and then the other, and means to ignite the mixture alternately in the two chambers.

9. In a device of the character described, a pair of combustion chambers, means to feed combustible mixture under pressure into said combustion chambers, outlets for the combustion chambers, an impulse member against which the outlets deliver expanding products of combustion from the chambers, coöperating closures for said outlets adapted to close first one outlet and then the other, and means to ignite the mixture alternately in the two chambers, valves controlling admission to the chambers, and said ignition means being in coöperation with said admission valves.

10. In a device of the character described, a pair of combustion chambers, means to feed combustible mixture under pressure into said combustion chambers, outlets for the combustion chambers, an impulse member against which the outlets deliver expanding products of combustion from the chambers, coöperating closures for said outlets adapted to close first one outlet and then the other, and means to ignite the mixture alternately in the two chambers, valves controlling admission to the chambers, the coöperating closure operating to control the ignition means through control of the admission valve.

In witness that I claim the foregoing I have hereunto subscribed my name this 26th day of July 1918.

RICHARD PAZOS-MARTINEZ.